Aug. 14, 1928.
A. C. CONNELL
1,680,765
CONTROL APPARATUS
Original Filed Feb. 23, 1926
Fig. 1.
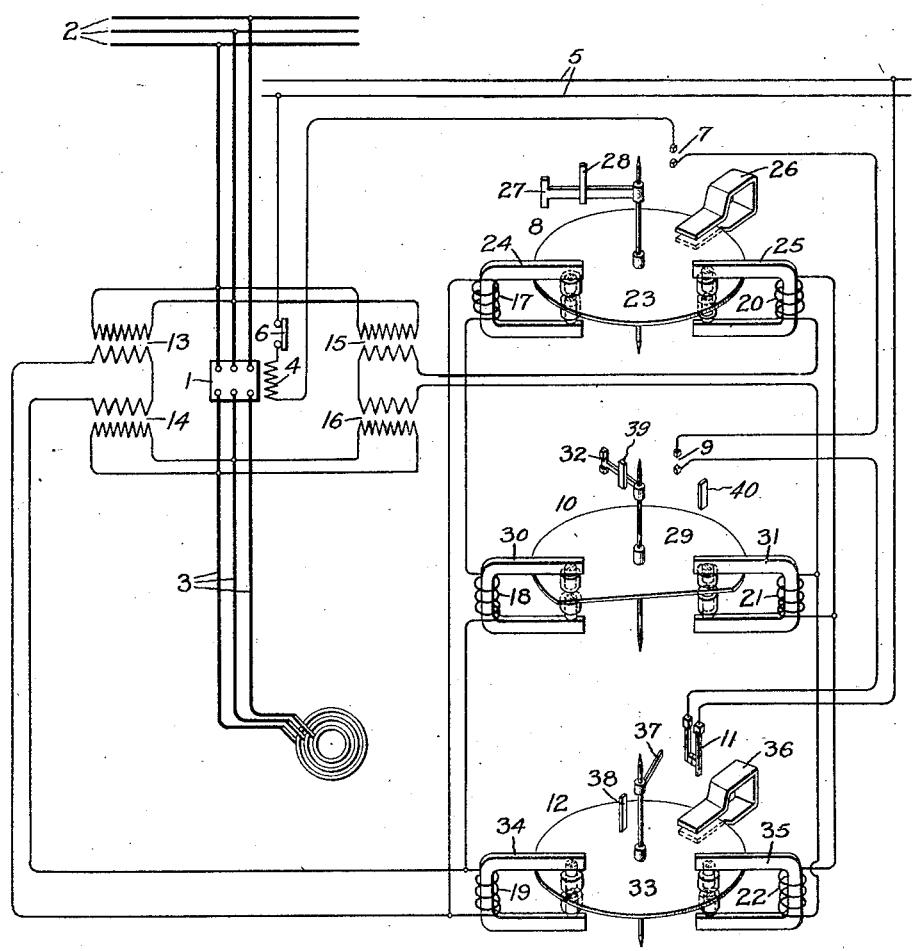
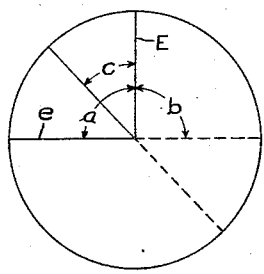
Fig. 2.
Inventor:
Amos C. Connell,
by *Alexander S. [signature]*
His Attorney.

Patented Aug. 14, 1928.

1,680,765

UNITED STATES PATENT OFFICE.

AMOS C. CONNELL, OF SCHENECTADY, NEW YORK, ASSIGNOR TO GENERAL ELECTRIC COMPANY, A CORPORATION OF NEW YORK.

CONTROL APPARATUS.

Application filed February 23, 1926, Serial No. 90,082. Renewed April 21, 1928.

My invention relates to apparatus for controlling the interconnection of alternating current circuits, and has for its principal object the provision of an improved apparatus that is operable within a predetermined range of difference between the circuit frequencies to cause the interconnection of the circuits when a certain phase relation is produced between their electromotive forces.

Various types of apparatus have been used in the past for causing two alternating current circuits or systems to be interconnected when they are in phase and operating at substantially the same voltage and frequency. Interconnection of the systems is usually effected through a switch provided with a control circuit which is energized only when the desired relation between the electrical conditions of the systems has been established. In the operation of such an apparatus, closure of the switch is not produced at the instant its control circuit is energized but occurs at a subsequent instant of time which is determined largely by the operating characteristics of the switch. It is therefore desirable to energize the control circuit of the switch at a time preceding phase coincidence by an interval sufficiently long to cause closure of the switch at or near phase coincidence of the system voltages.

Apparatus has been devised in the past for causing energization of the switch control circuit at an instant which precedes phase coincidence of the systems by a time interval long enough to produce closure of the switch at phase coincidence. In the operation of such apparatus however, it has been found that closure of the switch is produced at the wrong time when the difference between the system frequencies is less than a predetermined value. In accordance with my invention, means are provided for causing the switch control circuit to be energized only when the phase difference between the system electromotive forces is brought within a predetermined range of values and the difference between the system frequencies is maintained between predetermined maximum and minimum limits.

My invention will be better understood from the following description when considered in connection with the accompanying drawings and its scope will be pointed out in the appended claims.

Referring to the accompanying drawings, Fig. 1 shows an apparatus wherein my invention has been embodied; and Fig. 2 is a vector diagram relating to the operation of the apparatus illustrated by Fig. 1.

Fig. 1 shows a switch 1 which is connected between alternating current circuits or systems 2 and 3 and is provided with an operating coil 4 arranged to be connected to control current supply means shown as bus 5 through a control circuit comprising an auxiliary switch 6 arranged to be controlled by the main switch 1 so as to be closed when the main switch 1 is open and open when the main switch 1 is closed, a switch 7 controlled by a relay 8, a switch 9 controlled by a relay 10 and a switch 11 controlled by a relay 12. It will be apparent that the operating coil 4 may be controlled through an instantaneous closing, time delay opening relay or other device that is operated to its closed position by an instantaneous energization of the control circuit and is maintained in this position during a succeeding interval of time.

Current for controlling the operation of the relays 8, 10 and 12 is supplied from the lines 2 and 3 through a plurality of potential transformers 13 to 16, the primary windings of the transformers 13 and 15 being connected to the same phase of the circuit 2 and the transformers 14 and 16 being likewise connected to the circuit 3. It will be observed that the secondary circuits of the transformers 13 and 14 are interconnected so that their voltages are opposed when the circuits 2 and 3 are in phase, and that the secondary circuits of the transformers 15 and 16 are interconnected so that their voltages are added when the circuits 2 and 3 are in phase. Current is supplied from the secondary circuits of the transformers 13 and 14 to the operating coils 17, 18 and 19 of the relays 8, 10 and 12 respectively and from the secondary circuits of the transformers 15 and 16 to the operating coils 20, 21 and 22 of relays 8, 10 and 12 respectively.

The relay 8, which controls the switch 7, comprises an induction disk 23, a pair of shaded pole motor elements 24 and 25 arranged to exert opposed torques on the disk 23, and a drag magnet 26 for exerting on the disk 23 a retarding force whereby a time delay in the movement of the disk 23 is produced. The movable member 27 of the switch 7 is mounted on the shaft of the disk 23. This member is limited in its counter-clockwise movement by a stop 28 and in its clockwise movement by the stationary contacts of the switch 7. The position of the stop 28 relative to the stationary contacts of the switch 7 is preferably determined in accordance with the extent of the angular movement of the disk 23 required to produce a time delay which is long enough to prevent interconnection of the circuits 2 and 3 until the difference between their frequencies is low enough to ensure that the switch 1 will not be closed too long after phase coincidence of the circuit voltages.

The relay 10, which controls the switch 9, comprises an induction disk 29 and a pair of shaded pole motor elements 30 and 31 arranged to exert opposed torques on the disk 29. The movable member 32 of the switch 9 is mounted on the shaft of the disk 29 and is arranged to make passing contact with the stationary contacts of this switch, its movement being limited by stops 39 and 40. The disk 29 is so shaped and the shaded pole motor elements 30 and 31 are so arranged with respect to this disk that, when either of these motor elements exerts a torque strong enough to move the disk 29, movement of the disk strengthens the stronger torque and weakens the weaker torque. One way of accomplishing this result is to remove a segment of the disk 29, as illustrated. This construction has the advantage that a quick and positive action of the switch 9 is produced each time the circuit voltages approach phase coincidence at a rate which is within the operating range of the relay.

The relay 12, which controls the switch 11, comprises an induction disk 33, a pair of shaded pole motor elements 34 and 35 arranged to exert opposed torques on the disk 33 and a drag magnet 36 for exerting on the disk 33 a retarding force whereby a time delay in the movement of the disk 33 is produced. An operating member 37 of the switch 11 is mounted on the shaft of the disk 33. The switch 11 is biased to its closed position and is opened by movement of the operating member 37 in a clockwise direction. A stop 38 is provided for limiting the movement of the switch operating member 37 in a counter-clockwise direction. The position of the stop 38 relative to the stationary contact of switch 11 is such that the switch 11 is not opened by its operating member 37 unless the difference between the frequencies of the circuits 2 and 3 decreases below a value at which the switch 1 would be closed too long before phase coincidence.

Fig. 2 is a vector diagram showing various phase relations between the electromotive force E of circuit 2 and the electromotive force e of circuit 3. For convenience of explanation it will be assumed that the vector E is rotating in a clockwise direction at a constant speed and that the vector e is rotating in the same direction at an increasing speed.

With the stops 28 and 38 arranged as previously explained and the disk 29 constructed as set forth in the description of the relay 10, the switch 7 is closed only when the difference between the circuit frequencies decreases to a predetermined value, the switch 9 is quickly closed when a predetermined phase relation is produced between the system frequencies, and the switch 11 is opened only if the difference between the circuit frequencies falls below a predetermined value which is lower than the value by which closure of the switch 7 is produced. For example, the switch 7 may start to close when the vector e lags the vector E by an angle a and may start to open when the vector e leads the vector E by an angle b, the switch 9 may close for a short time when the vector e lags the vector E by an angle c and the switch 11 may open prior to closure of the switch 9 and subsequent to closure of the switch 7 only when the difference between the system frequencies is so low as to cause closure of the main switch before the vector e rotates into phase coincidence with the vector E. The control circuit of the main switch 1 is thus energized only when the difference between the frequencies of alternating current circuits is within predetermined maximum and minimum limits and when a definite phase relation is produced between the circuit electromotive forces.

The embodiment of the invention illustrated and described herein has been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States is:

1. The combination of two alternating current systems, and means for controlling the interconnection of said systems comprising a control circuit, a relay operable to complete a connection of said circuit only when the difference between the phases of said systems does not exceed predetermined limits which include phase coincidence, a relay operable to complete said circuit within said limits and at a time preceding phase coincidence, and a relay operable within said range to interrupt said circuit prior to said time when the difference between the system frequencies is less than a predetermined value.

2. The combination of two alternating current systems, and means for controlling the interconnection of said systems comprising a control circuit, a relay provided with coils connected to said systems and with a movable member operable to complete a connection of said control circuit only when the phase relation between said systems is within a predetermined range of variation including phase coincidence, means for preventing the completion of said connection when the difference between the frequencies of said systems exceeds a predetermined value, a relay provided with coils connected to said systems and with a movable member operable to complete said circuit within said range and at a time preceding phase coincidence of said systems, and means operable within said range to interrupt said circuit when the difference between the frequencies of said systems is less than a predetermined value.

3. The combination of two alternating current systems, and means for controlling the interconnection of said systems comprising a control circuit, a relay provided with coils connected to said systems and with a movable member operable to complete a connection of said control circuit only when the phase relation between said systems is within a predetermined range of variation including phase coincidence, means for preventing the completion of said connection when the difference between the frequencies of said systems exceeds a predetermined value, a relay provided with coils connected to said systems and with a movable member operable to complete said circuit within said range and at a time preceding phase coincidence of said systems, and means operable within said range to prevent completion of said circuit when the difference between the frequencies of said system is less than a predetermined value.

4. The combination of two alternating current systems, and means for controlling the interconnection of said systems comprising a control circuit, a relay provided with coils connected to said systems and with a movable member operable to complete a connection of said control circuit only when the phase relation between said systems is within a predetermined range of variation including phase coincidence, means for preventing the completion of said connection when the difference between the frequencies of said systems exceeds a predetermined value, a relay provided with coils connected to said systems and with a movable member operable to complete said circuit within said range and at a time preceding phase coincidence of said systems, and a relay provided with coils connected to said system and with a movable contact member operable within said range to interrupt said circuit when the difference between the frequencies of said system is less than a predetermined value.

5. In combination, two alternating current circuits and means for controlling the interconnection of said circuits comprising a control circuit and means controlled in accordance with the phase relation and the difference between the frequencies of the electromotive forces of the circuits for making a connection in said control circuit when the frequency difference is less than a predetermined value and for opening a connection in the control circuit when the frequency difference is less than a smaller predetermined value.

6. In combination, two alternating current circuits and means for controlling the interconnection of said circuits comprising a control circuit, a relay operable to make a connection in the control circuit only during a predetermined range of phase difference between the electromotive forces of the circuits, a relay operable to make another connection in the control circuit within said range, and a relay operable within said range to open a connection in the control circuit prior to the making of said other connection when the difference between the frequencies of the electromotive forces is less than a predetermined value.

7. In combination, two alternating current circuits, switching means for connecting the circuits and means controlled in accordance with the phase relation and the difference between the frequencies of the electromotive forces for starting the closing operation of the switching means within a predetermined range of phase difference when the frequency difference is less than a predetermined value and means controlled in accordance with the phase relation and the difference between the frequencies of the electromotive forces for preventing said closing operation when the difference between the frequencies is less than a smaller predetermined value.

8. In combination, two alternating current circuits, and means for controlling the interconnection of said circuits comprising a control circuit, a relay operable to make a connection in the control circuit only during a predetermined range of phase difference between the electromotive forces of the circuits when the difference between the frequencies of the electromotive forces is less than a predetermined value, and a relay operable within said range to open a connection in the control circuit when the difference between the frequencies is less than a smaller predetermined value.

9. In combination, two alternating current circuits and means for controlling the interconnection of said circuits comprising a control circuit, a relay operable to make a connection in the control circuit only during a predetermined range of phase difference between the electromotive forces of the circuits, a relay operable to make a momentary connection in the control circuit within said range, and a relay operable within said range to open a connection in the control circuit prior to said momentary connection when the difference between the frequencies of the electromotive forces is less than a predetermined value.

In witness whereof, I have hereunto set my hand this 20th day of February, 1926.

AMOS C. CONNELL.